United States Patent
Qian et al.

(10) Patent No.: US 10,318,064 B2
(45) Date of Patent: Jun. 11, 2019

(54) INFORMATION PROCESSING METHOD AND ELECTRONIC DEVICE

(71) Applicants: BEIJING LENOVO SOFTWARE LTD., Beijing (CN); LENOVO (BEIJING) LIMITED, Beijing (CN)

(72) Inventors: Minggui Qian, Beijing (CN); Nan Lin, Beijing (CN)

(73) Assignees: BEIJING LENOVO SOFTWARE LTD., Beijing (CN); LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 14/982,550

(22) Filed: Dec. 29, 2015

(65) Prior Publication Data
US 2017/0060336 A1   Mar. 2, 2017

(30) Foreign Application Priority Data
Aug. 31, 2015   (CN) .......................... 2015 1 0546658

(51) Int. Cl.
*G06F 3/041*       (2006.01)
*G09G 3/20*        (2006.01)

(52) U.S. Cl.
CPC ............. *G06F 3/0418* (2013.01); *G09G 3/20* (2013.01)

(58) Field of Classification Search
CPC .................................................. G06F 3/0418
See application file for complete search history.

(56) References Cited

U.S. PATENT DOCUMENTS

| 2014/0118283 A1* | 5/2014 | Wang | G06F 3/0412 |
| | | | 345/173 |
| 2014/0267067 A1* | 9/2014 | Fuller | G06F 3/0416 |
| | | | 345/173 |
| 2015/0248187 A1* | 9/2015 | Takahashi | G06F 3/044 |
| | | | 345/174 |

FOREIGN PATENT DOCUMENTS

| CN | 101957507 A | 1/2011 |
| CN | 102135837 A | 7/2011 |
| CN | 102236193 A | 11/2011 |
| CN | 102375589 A | 3/2012 |
| CN | 102707480 A | 10/2012 |
| CN | 102760405 A | 10/2012 |
| CN | 104020908 A | 9/2014 |

* cited by examiner

*Primary Examiner* — Michael A Faragalla
*Assistant Examiner* — Chayce R Bibbee
(74) *Attorney, Agent, or Firm* — Scully Scott Murphy & Presser

(57) ABSTRACT

The present disclosure discloses an information processing method and an electronic device. The method comprises obtaining display parameters of the display unit; determining a refresh rate of the display unit based on the display parameters; setting a first period and a second period in the refresh cycle; and generating a first control instruction to control the electronic device to refresh the touch detection unit while stopping refreshing the display unit during the first period of each refresh cycle, so as to enable the touch detection unit to detect a touch operation, and control the electronic device to refresh the display unit during the second period of each refresh cycle.

8 Claims, 4 Drawing Sheets

INFORMATION PROCESSING METHOD AND ELECTRONIC DEVICE

CROSS-REFERENCE TO RELATED APPLICATION(S)

This application claims priority to the Chinese Patent Application No. 201510546658.7, filed on Aug. 31, 2015, entitled "INFORMATION PROCESSING METHOD AND ELECTRONIC DEVICE," which is incorporated herein by reference in its entirety.

TECHNICAL FIELD

The present disclosure relates to the field of touch detection technique in a terminal, and in particular, to an information processing method and an electronic device.

BACKGROUND

Intelligent electronic devices take part in people's daily life more and more. A user may often use an intelligent electronic device provided with a touch detection unit, to obtain human-computer interaction experience of more convenience. However, the refresh rate of a display unit may interfere with the detection of the touch detection unit, which will impact the accuracy of detecting a touch operation, and thereby degrade the user's experience.

SUMMARY

In view of this, an object of the present disclosure is to provide an information processing method and an electronic device that can at least address the foregoing problems in the prior art.

In order to achieve the object, the present disclosure provides the following aspects.

An embodiment of the present disclosure provides an information processing method used in an electronic device having a touch detection unit and a display. The method comprises: obtaining display parameters of the display unit; determining a refresh rate of the display unit based on the display parameters; setting a first period and a second period in the refresh cycle; and generating a first control instruction to control the electronic device to refresh the touch detection unit while stopping refreshing the display unit during the first period of each refresh cycle, so as to enable the touch detection unit to detect a touch operation, and control the electronic device to refresh the display unit during the second period of each refresh cycle.

In the solution, the method may further comprise controlling the electronic device to stop refreshing the touch detection unit during the second period of each refresh cycle.

In the solution, generating a first control instruction comprises: obtaining operation status parameters of the electronic device; controlling the electronic device to generate the first control instruction if the electronic device is determined to be in a first operation status based on the operation status parameters of the electronic device.

In the solution, the method may further comprise: controlling the electronic device to refresh the touch detection unit and the display unit both at the same time if the electronic device is determined to be in a second operation status based on the operation status parameters.

In the solution, setting a first period and a second period in the refresh cycle comprises setting the first period to have a length smaller than that of the second period, and setting the first period to be ahead of the second period.

In the solution, the second periods of two contiguous refresh cycles are spaced by a period smaller than a preset period.

An embodiment of the present disclosure further provides an electronic device, comprising a touch detection unit, a display unit and a processing unit. The processing unit is configured to obtain display parameters of the display unit; determine a refresh rate of the display unit based on the display parameters; set a first period and a second period in the refresh cycle; and generate a first control instruction to control the electronic device to refresh the touch detection unit while stopping refreshing the display unit during the first period of each refresh cycle, so as to enable the touch detection unit to detect a touch operation, and control the electronic device to refresh the display unit during the second period of each refresh cycle. The touch detection unit is configured to refresh during the first period under the control of the processing unit and to detect a touch operation. The display unit is configured to refresh during the second period under the control of the processing unit.

In the solution, the processing unit is further configured to control the electronic device to stop refreshing the touch detection unit during the second period of each refresh cycle.

In the solution, the processing unit is further configured to obtain operation status parameters of the electronic device; control the electronic device to generate the first control instruction if the electronic device is determined to be in a first operation status based on the operation status parameters of the electronic device.

In the solution, the processing unit is further configured to control the electronic device to refresh the touch detection unit and the display unit both at the same time if the electronic device is determined to be in a second operation status based on the operation status parameters.

In the solution, the processing unit is further configured to set the first period to have a length smaller than that of the second period, and set the first period to be ahead of the second period.

In the solution, the processing unit is further configured to set the second period such that the second periods of two contiguous refresh cycles are spaced by a period smaller than a preset period.

According to the information processing method and electronic device of the embodiments of the present disclosure, a first period and a second period in the refresh cycle are determined based on display parameters of the display unit. The electronic device is controlled to refresh the touch detection unit while stopping refreshing the display unit during the first period of each refresh cycle so as to enable the touch detection unit to detect a touch operation, and to refresh the display unit during the second period of each refresh cycle. As such, since the display unit is not refreshed during the first period, the detection of a touch operation by the touch detection unit will not be interfered by the noise generated due to refresh of the display unit, and thus the interference of the display unit to the touch detection unit is prevented, thereby the accuracy of detecting a touch operation is ensured.

DETAILED DESCRIPTION

The present disclosure will be described in details below in conjunction with drawings and specific embodiments.

First Embodiment

Figure 1:
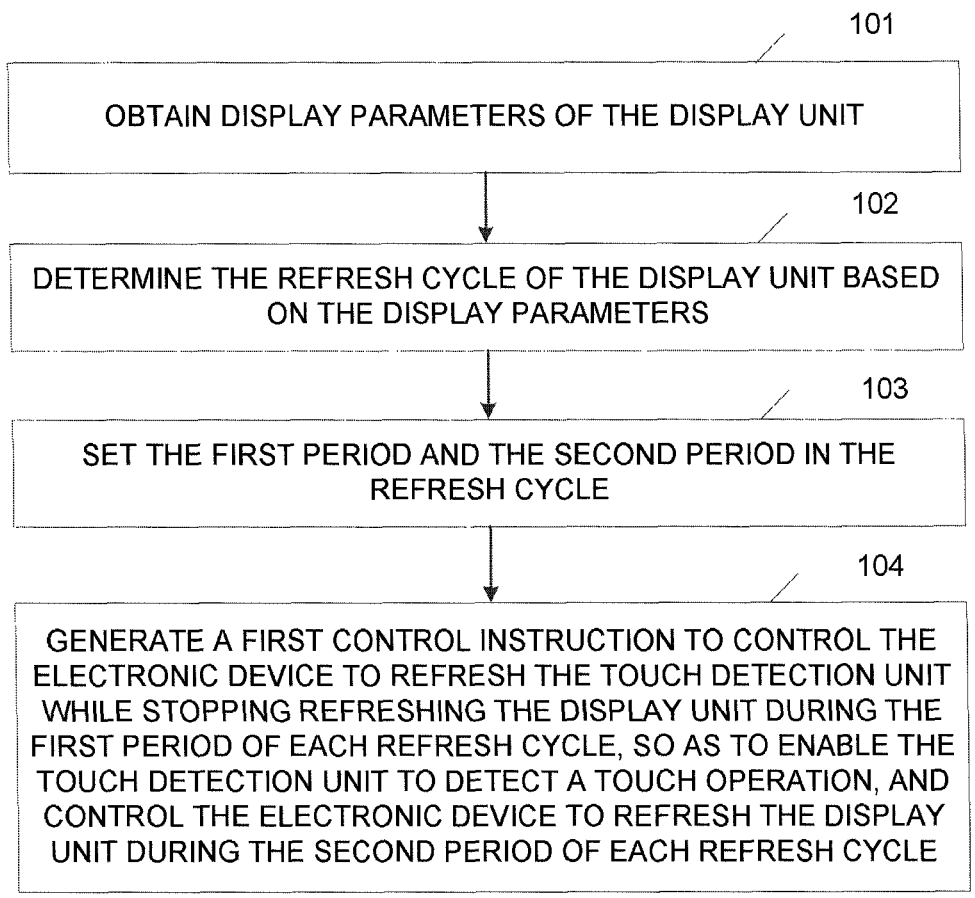
FIG. 1 is a first flowchart illustrating an information processing method according to an embodiment of the present disclosure.

The present embodiment provides an information processing method used in an electronic device having a touch detection unit and a display. As shown in FIG. 1, the method comprises:

Step 101 of obtaining display parameters of the display unit;

Step 102 of determining a refresh rate of the display unit based on the display parameters;

Step 103 of setting a first period and a second period in the refresh cycle;

Step 104 of generating a first control instruction to control the electronic device to refresh the touch detection unit while stopping refreshing the display unit during the first period of each refresh cycle, so as to enable the touch detection unit to detect a touch operation, and control the electronic device to refresh the display unit during the second period of each refresh cycle.

Here the electronic device may be a device such as a smart hone, a PAD and others.

The display parameters of the display unit obtained may include at least a pixel pitch, a number of pixels, a refresh rate and others.

The step of determining a refresh rate of the display unit based on the display parameters may comprise extracting the refresh rate from the display parameters of the display unit and calculating the refresh cycle by using the refresh rate.

The refresh cycle is an inverse of the refresh rate. For example, if the refresh rate of the display unit is 60 Hz, the refresh cycle is 16.6 ms.

Figure 2:
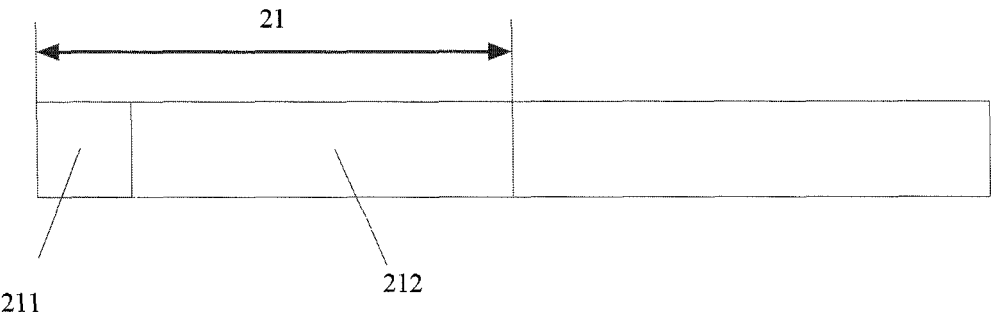
FIG. 2 is a diagram illustrating periods according to an embodiment of the present disclosure.

The step of setting a first period and a second period in the refresh cycle may comprise setting the first period to have a length smaller than that of the second period, and setting the first period to be ahead of the second period. As shown in FIG. 2, if the refresh cycle 21 has a length of 16.6 ms, the first period allocated to the touch detection unit may be the former 0-2 ms or 0-3 ms in the 16.6 ms and the remaining time period may be assigned to the second period 212.

Furthermore, in the embodiment, the display unit may be an LCD. In the embodiment, stopping refreshing the display unit means that the display screen of the LCD remains unchanged. Stopping refreshing the touch detection unit means that the touch detection unit does not detect a new touch operation.

Furthermore, in step 104, the method may further comprise controlling the electronic device to stop refreshing the touch detection unit during the second period of each refresh cycle. That is, at the time to refresh the display unit, the touch detection unit stops refreshing and does not detect a touch operation.

Figure 3:
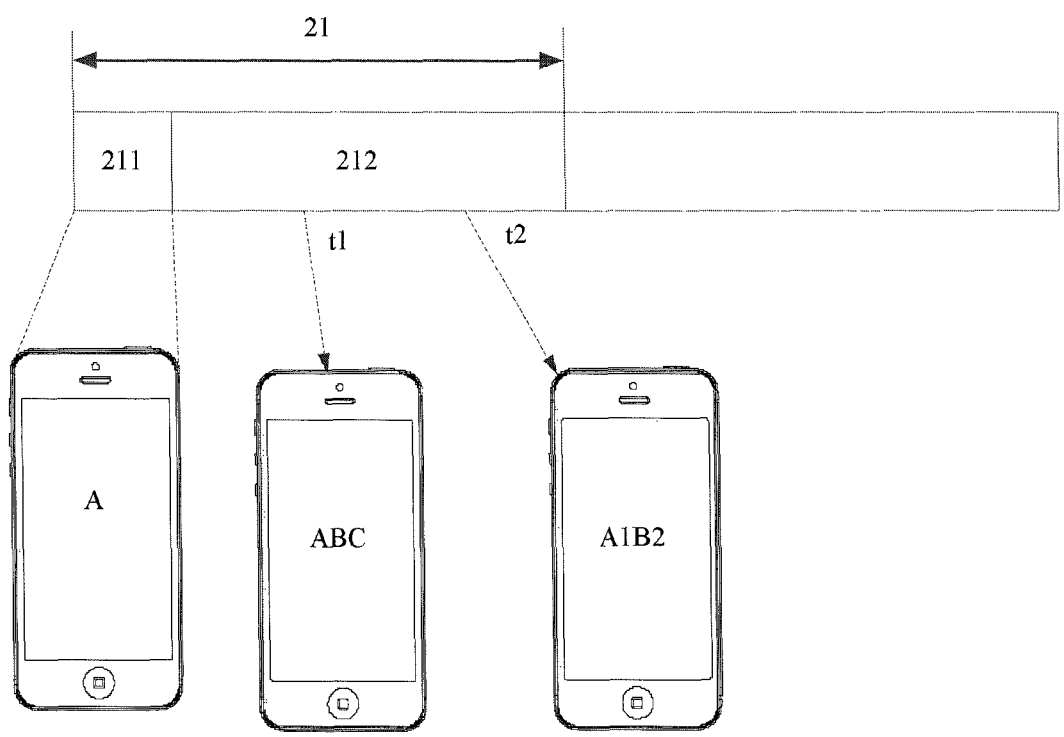
FIG. 3 is a first diagram illustrating a scenario according to an embodiment of the present disclosure.

The present embodiment will be further described in conjunction with FIG. 3 on the basis of FIG. 2.

The display parameters of the display unit are firstly obtained. The refresh cycle 21 of the display unit is determined based on the display parameters. The first period 211 and the second 212 in the refresh cycle 21 are set. A first control instruction is generated. Based on the first control instruction, the electronic device is controlled to refresh the touch detection unit while stopping refreshing the display unit during the first period 211 of each refresh cycle, so as to enable the touch detection unit to detect a touch operation, and to refresh the display unit while stopping refreshing the touch detection unit during the second period 212 of each refresh cycle.

As can be seen from FIG. 3, during the first period 11, the display content "A" remains since the display unit is not refreshed. During the second period 212, the display content is updated because it is to start to refresh the display unit. For example, at the time t1 in the second period 212, the content "ABC" is displayed; at the time t2 in the second period 212, the content "A1B2" is displayed.

It can be seen that by using the solution, a first period and a second period in the refresh cycle are determined based on display parameters of the display unit. The electronic device is controlled to refresh the touch detection unit while stopping refreshing the display unit during the first period of each refresh cycle so as to enable the touch detection unit to detect a touch operation, and to refresh the display unit during the second period of each refresh cycle. As such, since the display unit is not refreshed during the first period, the detection of a touch operation by the touch detection unit will not be interfered by the noise generated due to refresh of the display unit, and thus the interference of the display unit to the touch detection unit is prevented, thereby the accuracy of detecting a touch operation is ensured.

Second Embodiment

Figure 4:
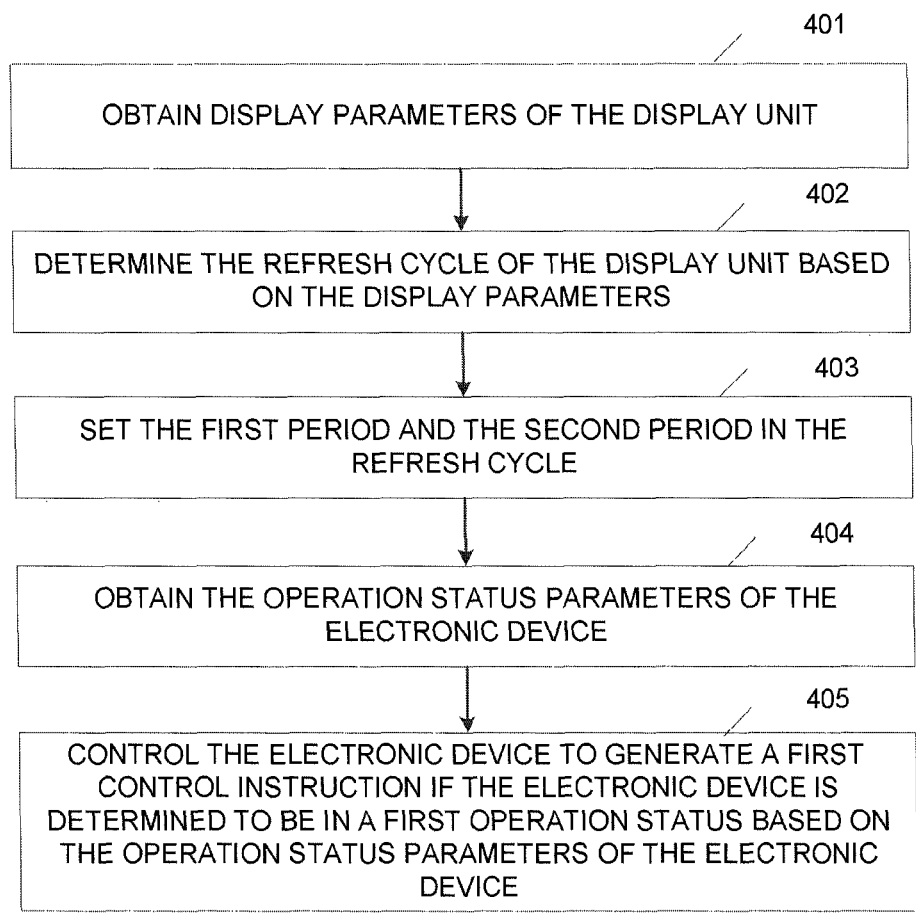
FIG. 4 is a second flow chart illustrating an information processing method according to an embodiment of the present disclosure.

The present embodiment provides an information processing method used in an electronic device having a touch detection unit and a display. As shown in FIG. 4, the method comprises:

Step 401 of obtaining display parameters of the display unit;

Step 402 of determining a refresh rate of the display unit based on the display parameters;

Step 403 of setting a first period and a second period in the refresh cycle;

Step 404 of obtaining operation status parameters of the electronic device;

Step 405 of controlling the electronic device to generate a first control instruction if the electronic device is determined to be in a first operation status based on the operation status parameters of the electronic device, and based on the first control instruction, controlling the electronic device to refresh the touch detection unit while stopping refreshing the display unit during the first period of each refresh cycle, so as to enable the touch detection unit to detect a touch operation, and controlling the electronic device to refresh the display unit during the second period of each refresh cycle.

Here the electronic device may be a device such as a smart hone, a PAD and others.

The display parameters of the display unit obtained may include at least a pixel pitch, a number of pixels, a refresh rate and others.

The step of determining a refresh rate of the display unit based on the display parameters may comprise extracting the refresh rate from the display parameters of the display unit and calculating the refresh cycle by using the refresh rate.

The refresh cycle is an inverse of the refresh rate. For example, if the refresh rate of the display unit is 60 Hz, the refresh cycle is 16.6 ms.

The step of setting a first period and a second period in the refresh cycle may comprise setting the first period to have a length smaller than that of the second period, and setting the first period to be ahead of the second period. As shown in FIG. 2, if the refresh cycle 21 has a length of 16.6 ms, the first period allocated to the touch detection unit may be the former 0-2 ms or 0-3 ms in the 16.6 ms and the remaining time period may be assigned to the second period 212.

Moreover, the second periods of two contiguous refresh cycles are spaced by a period smaller than a preset period. The preset period may be set according to the real situation. For example, since a human eye cannot perceive a picture delayed by 2-3 ms, the preset period may be set to be smaller than 3 ms.

Furthermore, in the embodiment, the display unit may be an LCD. In the embodiment, stopping refreshing the display unit means that the display screen of the LCD remains unchanged. Stopping refreshing the touch detection unit means that the touch detection unit does not detect a new touch operation.

Preferably, in the embodiment, the step of obtaining operation status parameters of the electronic device may comprise detecting whether the electronic device is in a status of using a touch-sensitive part to work. For example, if the user uses a touch-sensitive part to perform a touch operation on the touch detection unit, a touch operation may be performed on the touch detection unit via the touch-sensitive part. Accordingly, if the touch detection unit detects that an area of a touch region is smaller than a preset threshold, it determines that the operation status parameters indicate a status of using a touch-sensitive part to perform a touch operation. It can be recognized that if a touch operation is performed by using a touch-sensitive part, such as a stylus, the area of the touched region of the touch detection unit is necessarily smaller than that of the touched region of a human's finger on the touch detection unit. Thus, the operation status of the electronic device can be differentiated by setting the area of the touch region.

In step 405, the method may further comprise controlling the electronic device to stop refreshing the touch detection unit during the second period of each refresh cycle. That is, at the time to refresh the display unit, the touch detection unit stops refreshing and does not detect a touch operation.

Furthermore, it may determine that the electronic device is in the first operation status when the user enters a menu and selects an option of "touch-sensitive" operation.

Figure 5:
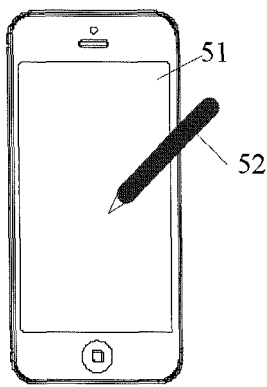
FIG. 5 is a second diagram illustrating a scenario according to an embodiment of the present disclosure.

In other words, if the touch operation comes from a touch signal of a stylus, the present embodiment controls the display unit and the touch detection unit to refresh at different periods when it is determined that a touch-sensitive part is used because it is more vulnerable to the refresh rate of the display unit. As shown in FIG. 5, the touch-sensitive part is a stylus 52. The first operation status of the present embodiment is that a touch operation is performed on the touch detection unit 51 of the electronic device via the stylus 52.

In the foregoing scenario, the electronic device is controlled to refresh the touch detection unit and the display unit both at the same time if the electronic device is determined to be in a second operation status based on the operation status parameters.

The present embodiment will be further described in conjunction with FIG. 3 on the basis of FIG. 2.

The display parameters of the display unit are firstly obtained. The refresh cycle 21 of the display unit is determined based on the display parameters. The first period 211 and the second 212 in the refresh cycle 21 are set. A first control instruction is generated. Based on the first control instruction, the electronic device is controlled to refresh the touch detection unit while stopping refreshing the display unit during the first period 211 of each refresh cycle, so as to enable the touch detection unit to detect a touch operation, and to refresh the display unit while stopping refreshing the touch detection unit during the second period 212 of each refresh cycle.

As can be seen from FIG. 3, during the first period 11, the display content "A" remains since the display unit is not refreshed. During the second period 212, the display content is updated because it is to start to refresh the display unit. For example, at the time t1 in the second period 212, the content "ABC" is displayed; at the time t2 in the second period 212, the content "A1B2" is displayed.

It can be seen that by using the solution, a first period and a second period in the refresh cycle are determined based on display parameters of the display unit. The electronic device is controlled to refresh the touch detection unit while stopping refreshing the display unit during the first period of each refresh cycle so as to enable the touch detection unit to detect a touch operation, and to refresh the display unit during the second period of each refresh cycle. As such, since the display unit is not refreshed during the first period, the detection of a touch operation by the touch detection unit will not be interfered by the noise generated due to refresh of the display unit, and thus the interference of the display unit to the touch detection unit is prevented, thereby the accuracy of detecting a touch operation is ensured.

Third Embodiment

Figure 6:
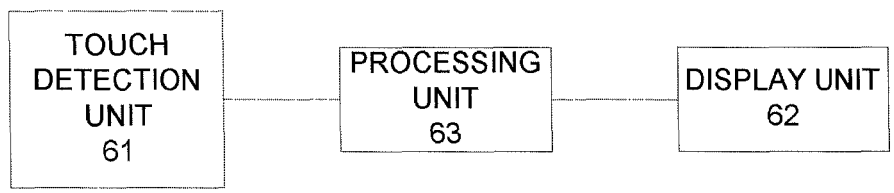
FIG. 6 is a diagram illustrating the structure of an electronic device according to an embodiment of the present disclosure.

The present embodiment provides an electronic device. As shown in FIG. 6, the electronic device comprises a touch detection unit 61, a display unit 62 and a processing unit 63.

The processing unit 63 is configured to obtain display parameters of the display unit; determine a refresh rate of the display unit based on the display parameters; set a first period and a second period in the refresh cycle; and generate a first control instruction to control the electronic device to refresh the touch detection unit while stopping refreshing the display unit during the first period of each refresh cycle, so as to enable the touch detection unit to detect a touch operation, and control the electronic device to refresh the display unit during the second period of each refresh cycle.

The touch detection unit 61 is configured to refresh during the first period under the control of the processing unit and to detect a touch operation.

The display unit 62 is configured to refresh during the second period under the control of the processing unit.

Here the electronic device may be a device such as a smart hone, a PAD and others.

The display parameters of the display unit obtained may include at least a pixel pitch, a number of pixels, a refresh rate and others.

Determining a refresh rate of the display unit based on the display parameters may comprise extracting the refresh rate from the display parameters of the display unit and calculating the refresh cycle by using the refresh rate.

The refresh cycle is an inverse of the refresh rate. For example, if the refresh rate of the display unit is 60 Hz, the refresh cycle is 16.6 ms.

The processing unit may be further configured to set the first period to have a length smaller than that of the second period, and set the first period to be ahead of the second period. As shown in FIG. 2, if the refresh cycle 21 has a length of 16.6 ms, the first period allocated to the touch detection unit may be the former 0-2 ms or 0-3 ms in the 16.6 ms and the remaining time period may be assigned to the second period 212.

In the foregoing scenario, the electronic device is controlled to refresh the touch detection unit and the display unit both at the same time if the electronic device is determined to be in a second operation status based on the operation status parameters.

The processing unit may be further configured to control the electronic device to stop refreshing the touch detection unit during the second period of each refresh cycle.

The present embodiment will be further described in conjunction with FIG. 3 on the basis of FIG. 2.

The display parameters of the display unit are firstly obtained. The refresh cycle 21 of the display unit is determined based on the display parameters. The first period 211 and the second 212 in the refresh cycle 21 are set. A first control instruction is generated. Based on the first control instruction, the electronic device is controlled to refresh the touch detection unit while stopping refreshing the display unit during the first period 211 of each refresh cycle, so as to enable the touch detection unit to detect a touch operation, and to refresh the display unit while stopping refreshing the touch detection unit during the second period 212 of each refresh cycle.

As can be seen from FIG. 3, during the first period 11, the display content "A" remains since the display unit is not refreshed. During the second period 212, the display content is updated because it is to start to refresh the display unit. For example, at the time t1 in the second period 212, the content "ABC" is displayed; at the time t2 in the second period 212, the content "A1B2" is displayed.

It can be seen that by using the solution, a first period and a second period in the refresh cycle are determined based on display parameters of the display unit. The electronic device is controlled to refresh the touch detection unit while stopping refreshing the display unit during the first period of each refresh cycle so as to enable the touch detection unit to detect a touch operation, and to refresh the display unit during the second period of each refresh cycle. As such, since the display unit is not refreshed during the first period, the detection of a touch operation by the touch detection unit will not be interfered by the noise generated due to refresh of the display unit, and thus the interference of the display unit to the touch detection unit is prevented, thereby the accuracy of detecting a touch operation is ensured.

Fourth Embodiment

The present embodiment provides an electronic device. As shown in FIG. 6, the electronic device comprises a touch detection unit 61, a display unit 62 and a processing unit 63.

The processing unit 63 is configured to obtain display parameters of the display unit; determine a refresh rate of the display unit based on the display parameters; set a first period and a second period in the refresh cycle; and generate a first control instruction to control the electronic device to refresh the touch detection unit while stopping refreshing the display unit during the first period of each refresh cycle, so as to enable the touch detection unit to detect a touch operation, and control the electronic device to refresh the display unit during the second period of each refresh cycle.

The touch detection unit 61 is configured to refresh during the first period under the control of the processing unit and to detect a touch operation.

The display unit 62 is configured to refresh during the second period under the control of the processing unit.

Here the electronic device may be a device such as a smart hone, a PAD and others.

The display parameters of the display unit obtained may include at least a pixel pitch, a number of pixels, a refresh rate and others.

Determining a refresh rate of the display unit based on the display parameters may comprise extracting the refresh rate from the display parameters of the display unit and calculating the refresh cycle by using the refresh rate.

The refresh cycle is an inverse of the refresh rate. For example, if the refresh rate of the display unit is 60 Hz, the refresh cycle is 16.6 ms.

Setting a first period and a second period in the refresh cycle may comprise setting the first period to have a length smaller than that of the second period, and setting the first period to be ahead of the second period. As shown in FIG. 2, if the refresh cycle 21 has a length of 16.6 ms, the first period allocated to the touch detection unit may be the former 0-2 ms or 0-3 ms in the 16.6 ms and the remaining time period may be assigned to the second period 212.

Moreover, the second periods of two contiguous refresh cycles are spaced by a period smaller than a preset period. The preset period may be set according to the real situation. For example, since a human eye cannot perceive a picture delayed by 2-3 ms, the preset period may be set to be smaller than 3 ms.

Furthermore, in the embodiment, the display unit may be an LCD. In the embodiment, stopping refreshing the display unit means that the display screen of the LCD remains unchanged. Stopping refreshing the touch detection unit means that the touch detection unit does not detect a new touch operation.

Preferably, in the embodiment, obtaining operation status parameters of the electronic device may comprise detecting whether the electronic device is in a status of using a touch-sensitive part to work. For example, if the user uses a touch-sensitive part to perform a touch operation on the touch detection unit, a touch operation may be performed on the touch detection unit via the touch-sensitive part. Accordingly, if the touch detection unit detects that an area of a touch region is smaller than a preset threshold, it determines that the operation status parameters indicate a status of using a touch-sensitive part to perform a touch operation. It can be recognized that if a touch operation is performed by using a touch-sensitive part, such as a stylus, the area of the touched region of the touch detection unit is necessarily smaller than that of the touched region of a human's finger on the touch detection unit. Thus, the operation status of the electronic device can be differentiated by setting the area of the touch region.

The processing unit may be further configured to control the electronic device to stop refreshing the touch detection unit during the second period of each refresh cycle.

Furthermore, it may determine that the electronic device is in the first operation status when the user enters a menu and selects an option of "touch-sensitive" operation.

In other words, if the touch operation comes from a touch signal of a stylus, the present embodiment controls the display unit and the touch detection unit to refresh at different periods when it is determined that a touch-sensitive part is used because it is more vulnerable to the refresh rate of the display unit. As shown in FIG. 5, the touch-sensitive part is a stylus 52. The first operation status of the present embodiment is that a touch operation is performed on the touch detection unit 51 of the electronic device via the stylus 52.

In the foregoing scenario, the electronic device is controlled to refresh the touch detection unit and the display unit both at the same time if the electronic device is determined to be in a second operation status based on the operation status parameters.

It can be seen that by using the solution, a first period and a second period in the refresh cycle are determined based on display parameters of the display unit. The electronic device is controlled to refresh the touch detection unit while stopping refreshing the display unit during the first period of each refresh cycle so as to enable the touch detection unit to detect a touch operation, and to refresh the display unit during the second period of each refresh cycle. As such, since the display unit is not refreshed during the first period, the detection of a touch operation by the touch detection unit will not be interfered by the noise generated due to refresh of the display unit, and thus the interference of the display unit to the touch detection unit is prevented, thereby the accuracy of detecting a touch operation is ensured.

It should be recognized that the disclosed device may be implemented in other ways in the disclosed embodiments of the disclosure. The device embodiments described above is only for illustration and may be divided in other ways in real scenario. For example, some feature may be omitted. Furthermore, coupling, direct coupling or communicative connecting among various components shown or discussed may be coupled, directly coupled, or communicatively connected via some interfaces, devices or units, and electrically, mechanically or in other manners.

The units described in separate parts may be or may be not physically separated. The part shown as a unit may be or may be not a physical unit. A part or all of the units can be selected according to the real requirements to achieve the object of the present disclosure.

The above are merely preferable embodiments of the present disclosure, not to limit the present disclosure. Those skilled in the art can make various modifications and variations to the present disclosure without departing from the scope of the present disclosure, which shall be included in the scope of the present disclosure. Thus, the protection of the present disclosure is only limited by the attached claims.

We claim:

1. An information processing method used in an electronic device having a touch detection unit and a display unit, comprising:
    obtaining display parameters of the display unit;
    determining a refresh rate of the display unit based on the display parameters;
    setting a first period and a second period in each refresh cycle;
    obtaining operation status parameters of the electronic device;
    when the electronic device is determined to be in a first operation status based on the operation status parameters of the electronic device, generating a first control instruction to control the electronic device to refresh the touch detection unit while stopping refreshing the display unit during the first period of each refresh cycle, so as to enable the touch detection unit to detect a touch operation, and control the electronic device to refresh the display unit during the second period of each refresh cycle; and
    when the electronic device is determined to be in a second operation status based on the operation status parameters, controlling the electronic device to refresh both the touch detection unit and the display unit at the same time,
    wherein the first operation status is that the touch detection unit detects that an area of a touch region is smaller than a preset threshold and the second operation status is that the touch detection unit detects that an area of a touch region is not smaller than a preset threshold.

2. The information processing method according to claim 1, further comprising controlling the electronic device to stop refreshing the touch detection unit during the second period of each refresh cycle.

3. The information processing method according to claim 1, wherein setting a first period and a second period in the refresh cycle comprises setting the first period to have a length smaller than that of the second period, and setting the first period to be ahead of the second period.

4. The information processing method according to claim 3, wherein the second periods of two contiguous refresh cycles are spaced by a period smaller than a preset period.

5. An electronic device, comprising:
    a processing unit configured to:
        obtain display parameters of the display unit;
        determine a refresh rate of the display unit based on the display parameters;
        set a first period and a second period in each refresh cycle;
        obtain operation status parameters of the electronic device;
        when the electronic device is determined to be in a first operation status based on the operation status parameters of the electronic device, generate a first control instruction to control the electronic device to refresh the touch detection unit while stopping refreshing the display unit during the first period of each refresh cycle, so as to enable the touch detection unit to detect a touch operation, and control the electronic device to refresh the display unit during the second period of each refresh cycle; and
        when the electronic device is determined to be in a second operation status based on the operation status parameters, control the electronic device to refresh both the touch detection unit and the display unit at the same time:
    a touch detection unit configured to refresh during the first period under the control of the processing unit and to detect a touch operation; and
    a display unit configured to refresh during the second period under the control of the processing unit,
    wherein the first operation status is that the touch detection unit detects that an area of a touch region is smaller than a preset threshold and the second operation status is that the touch detection unit detects that an area of a touch region is not smaller than a preset threshold.

6. The electronic device according to claim 5, wherein the processing unit is further configured to control the electronic device to stop refreshing the touch detection unit during the second period of each refresh cycle.

7. The electronic device according to claim 5, wherein the processing unit is further configured to set the first period to have a length smaller than that of the second period, and set the first period to be ahead of the second period.

8. The electronic device according to claim 7, wherein the processing unit is further configured to set the second period such that the second periods of two contiguous refresh cycles are spaced by a period smaller than a preset period.

* * * * *